United States Patent
Hamid

(10) Patent No.: US 7,529,944 B2
(45) Date of Patent: May 5, 2009

(54) SUPPORT FOR MULTIPLE LOGIN METHOD

(75) Inventor: Laurence Hamid, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 443 days.

(21) Appl. No.: 10/067,403

(22) Filed: Feb. 7, 2002

(65) Prior Publication Data

US 2003/0149882 A1 Aug. 7, 2003

(51) Int. Cl.
*H04L 9/00* (2006.01)
*H04L 9/32* (2006.01)
*H04K 1/00* (2006.01)

(52) U.S. Cl. .................. 713/186; 713/166; 713/193; 726/9; 726/20; 726/27

(58) Field of Classification Search ......... 713/185–200; 308/54; 705/51
See application file for complete search history.

(56) References Cited

U.S. PATENT DOCUMENTS

| | | | |
|---|---|---|---|
| 5,995,630 A * | 11/1999 | Borza | 380/54 |
| 6,035,398 A * | 3/2000 | Bjorn | 713/186 |
| 6,052,468 A | 4/2000 | Hillhouse | |
| 6,170,058 B1 | 1/2001 | Kausik | |
| 6,230,272 B1 | 5/2001 | Lockhart et al. | |
| 6,311,272 B1 * | 10/2001 | Gressel | 713/186 |
| 2003/0115142 A1 * | 6/2003 | Brickell et al. | 705/51 |

FOREIGN PATENT DOCUMENTS

WO WO 1 176 489 A2 1/2002

OTHER PUBLICATIONS

D corcoran, D Sims, B Hillhouse, Smart Cards and Biometrics: The cool way to make secure transactions, Mar. 1999, Linux Journal ACM, 1-8.*

* cited by examiner

*Primary Examiner*—Kaveh Abrishamkar
(74) *Attorney, Agent, or Firm*—Perkins Coie LLP

(57) ABSTRACT

A method of securing security data stored on a computer system is disclosed. The method comprises providing a data key to the computer system. The data key is used for transforming the security data in a reversible fashion to produce an encoded secure data such that the data key is required in order to perform a reverse transform and extract the security data from the encoded secure data. The encoded secure data are stored secure data in a fashion such that a user authorization process is used to retrieve the encoded secure data. Furthermore, the encoded secure data are stored such that the data key and the user authorization process in combination provide access to the security data and such that the stored data within the computer system is encoded.

37 Claims, 3 Drawing Sheets

SUPPORT FOR MULTIPLE LOGIN METHOD

FIELD OF THE INVENTION

The present invention relates to a method for allowing people to access data through a plurality of mechanisms and more precisely to a method for supporting multiple login.

BACKGROUND OF THE INVENTION

Computer security is fast becoming an important issue. With the proliferation of computers and computer networks into all aspects of business and daily life—financial, medical, education, government, and communications—the concern over secure file access and data communications is growing. One method of preventing unauthorized access to files is by using encryption and cipher techniques. These techniques convert data into other forms of data in a fashion that is reversible. Once encrypted, the data is unintelligible unless first decrypted. RSA, DES and CAST are known encryption techniques, which are currently believed to provide sufficient security for computer communications and files.

Each of these encryption techniques uses a cipher key. Such a key is crucial to the encryption/decryption process. Anyone with a correct key can access information that has previously been encrypted using that key. The entry of the key from the keyboard is impractical since a user must remember such a key for entry and as such is liable to be discovered by an individual desiring access to existing encrypted files.

Further, there is great concern over communication of keys within commercial and governmental offices. It is common for users to inform others of their keys or to transfer their keys to others for use during holidays, sick days, or even as a reminder of the key should the user forget. Also, keys are often written down at the workstation in case a user should forget. Such written passwords undermine the security of many systems.

In DES encryption, the key is a numerical value, for example 56 bits in length. Such a key can be used to encrypt and subsequently to decrypt data. The security of the data once encrypted is sufficient that the key is required to access the data in an intelligible form. Thus the security of the data is related to the security of the key.

Some encryption systems use keys stored on the same device as the encrypted files. This is akin to storing a lock and its key in the same location. A knowledgeable user gaining access to the device could locate the key and access the data. Other encryption systems use keys stored on portable cards. Such a key is accessed via a password entered at the keyboard. Other users can take such a portable card and such a password can be discovered. The portable card is equally subject to transfer between employees and improper storage—at a user's desk.

A security access system that provides substantially secure access and does not require a password or access code is a biometric identification system. A biometric identification system accepts unique biometric information from a user and identifies the user by matching the information against information belonging to registered users of the system.

Unfortunately, a device specifically designed to gain access to a system secured through biometric information is plausible. Such a device connects to a personal computer in a same fashion as a contact-imaging device but does not require provision of biometric information. Some forms of infiltrating biometric systems include a record-play back attack wherein biometric information is intercepted, recorded, and then played back at a later time; repeat pattern sending, wherein patterns are sent to the biometric identification system until an authorization occurs; etc. It would be advantageous to restrict the use of third party contact imaging systems with a security identification system in order to improve security.

Typically, data or information is secured on a hard drive by using an encryption key to encrypt data and decryption key to restore the data. Thus, providing a password to the system activates the encryption/decryption key that allows encryption or decryption of the data. A major concern exists when considering a security system based upon such system; the key and the encrypted data are stored on the same hard drive. As such, knowing a user's password give access to the encrypted data.

OBJECT OF THE INVENTION

It is an object of this invention to provide a key data to a system, the key data being encoded using a data value in the form of a password.

It is another object of this invention to transform the key data using a reversible hash process.

It is a further object of this invention to allow an individual to access encrypted data through a plurality of mechanisms.

It is another further object of this invention to provide a method for supporting multiple login.

SUMMARY OF THE INVENTION

In accordance with a preferred embodiment of the present invention, there is provided a method of securing security data stored on a computer system comprising the steps of: providing a data key to the computer system; transforming the security data with the data key in a reversible fashion to produce encoded secure data such that the data key is required in order to perform a reverse transform and extract the security data from the encoded secure data; and, storing the encoded secure data in a fashion such that a user authorization process is used to retrieve the encoded secure data such that the data key and the user authorization process in combination, provide access to the security data and such that the stored data within the computer system is encoded.

In accordance with another preferred embodiment of the present invention, there is provided a method of securing security data stored on a computer system comprising the steps of: providing a biometric information source and comparing the biometric information source against stored templates associated with the biometric information source; and for, in dependence upon a comparison result pairing biometric information source with a first individual identity; providing a data key associated with a second individual identity; the data key being other than stored on the computer system; retrieving encoded security data associated with the biometric information, and using the key data for decoding the encoded security data In accordance with another preferred embodiment of the present invention, there is provided a method of securing data stored on a computer system comprising the steps of: providing a first information sample to a computer system; hashing the first information sample to produce a first hash value; encoding key data in dependence upon the first hash value to produce first security data, the key data for use in decoding stored encoded data; providing at least one biometric information sample; securing the first security data in dependence upon at least one of the at least one biometric information sample.

BRIEF DESCRIPTION OF THE DRAWINGS

Exemplary embodiments of the invention will now be described in conjunction with the following drawings, in which.

DETAILED DESCRIPTION OF THE INVENTION

In password based security systems, secure data such as encryption keys are stored encoded based on the password to access same. In effect, a password must be provided in order to access the encryption keys stored within the system. Since the password is not stored anywhere within the data store, it is very difficult to decode the encryption keys without having actual knowledge of the password.

Figure 1:
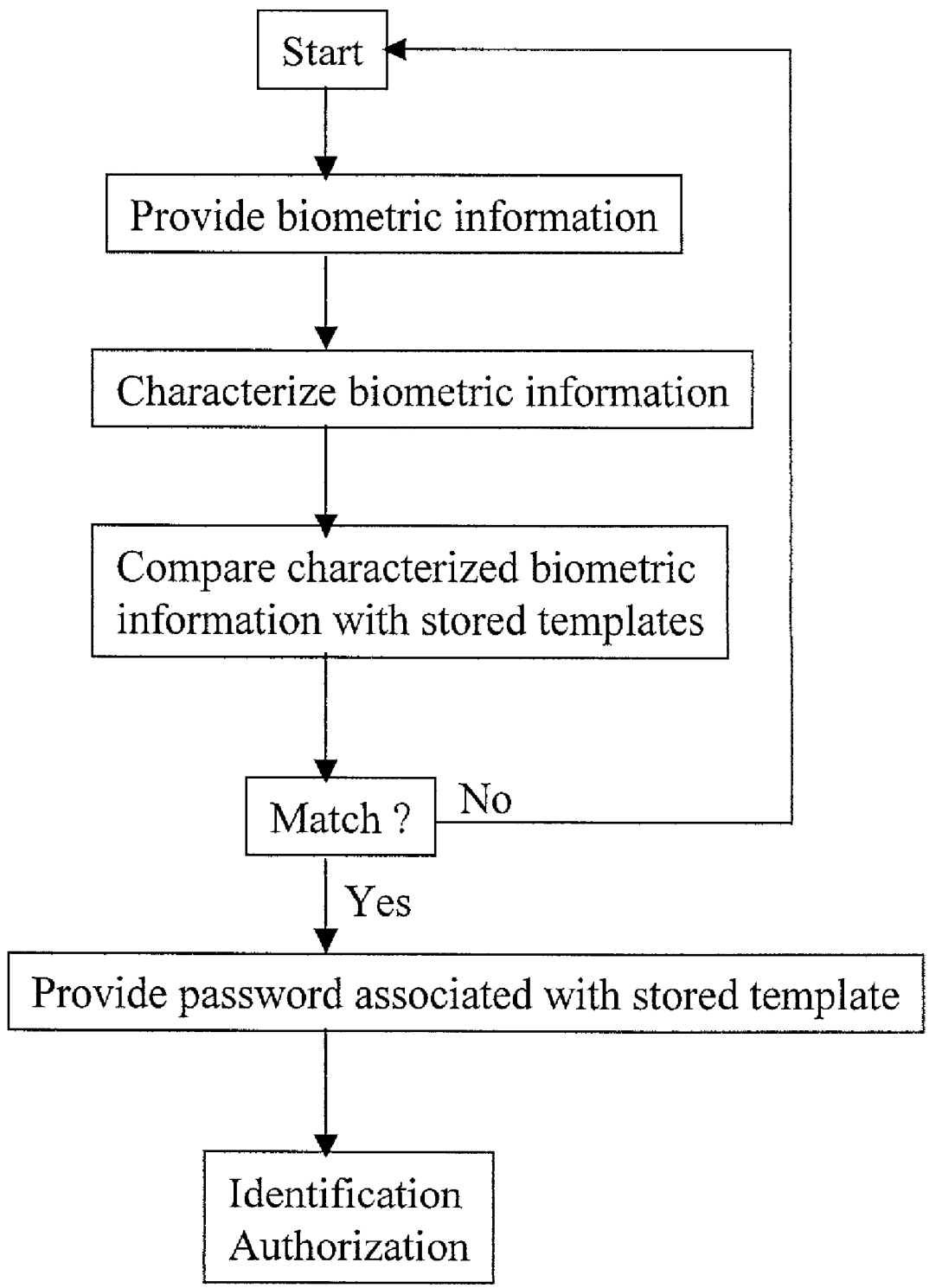
FIG. 1 is a flow diagram of a prior art method of associating a password to a fingerprint upon a match of a fingerprint with an associated template.

The security systems wherein biometric information is used for identifying and authorizing access to an individual mostly rely on a prior art method as shown in FIG. 1. After biometric information sample, in a form of a fingertip for example, has been provided to a system, the fingertip is imaged and the fingerprint is characterized. During the process of identification, the fingerprint is compared to stored templates associated with fingerprints of the person—for a one-to-one identification system—or of any person susceptible to access the system—in a one-to-many identification system. Upon a positive result of the comparison, when there is a match between the provided fingerprint and a stored template associated with a fingerprint, the system provides a password associated with the stored template and the user is identified and authorized. According to such a method, passwords are stored with the templates giving rise to security concerns. Moreover, when the system uses encryption to secure the passwords, the decryption key is stored within the system and as such a skilled person may find the decryption key given sufficient time by simply mining the data store.

The use of a biometric imaging device with a personal computer is considered inevitable. Unfortunately, a sample of biometric information is unchanging. Once a person has left their fingerprint on a table, or a glass, or a window, it is available to everyone. Once someone is in possession of a fingerprint, that fingerprint is known and cannot easily be modified. Therefore, data cannot simply be encoded using fingerprint data.

A major problem with a security system as described is that the password for accessing to the data is stored on the hard drive secured by the biometric information. Furthermore, the password when provided gives access to an encryption/decryption key on the same system or another system. When the key is decoded, the data are retrievable in an intelligible human language. As is apparent to a person with skill in the art, the key and the encrypted data are stored in a same system. As such, as soon as a user's password is found by an unauthorized person—for example through a process of data mining, the encryption/decryption key and the encrypted data stored on the same hard drive are accessible, and the system security is breached.

Figure 2A:
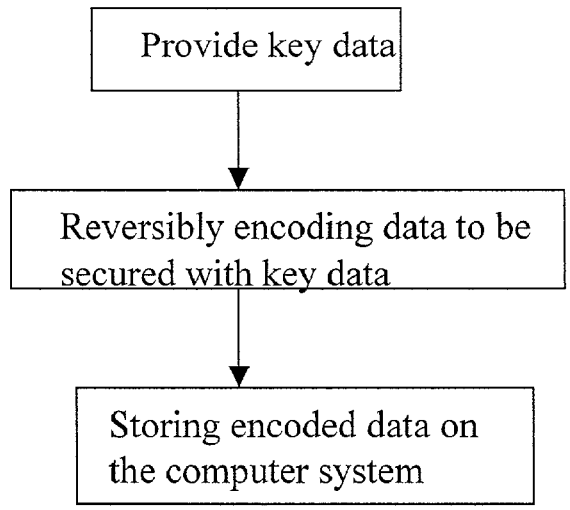
FIG. 2a is a flow diagram of a method of securing security data stored on a computer system.

To overcome such a major inconvenience, FIG. 2a illustrates in flow diagram a method of securing security data stored on a computer system. Typically, for securing data on a computer system, key data in the form of a password for example is provided to the computer system or is generated therein. The key data is typically associated with a single user or group. For example, the key data is in the form of a 128-bit encryption key. According to the invention, the key data is encoded using a data value in the form of a password provided by a user. The transformation of the key data, according to the present invention, comprises a reversible hash process.

Preferably, the password is also hashed in an irreversible fashion and stored on the system to allow for password validation. An example of such a hash process is described below. Assuming a user's password is a series of symbols related to the user, as for example the user's name, the password is hashed to provide a series of symbols representing a transformation of the password into numerals and a conversion using a hexadecimal based numeric system. A result of the hashing procedure is 41 4E 4E 45. After the encoding step, the series of symbols is irreversibly encoded to provide a set of values. The set of values obtained is stored within the system to allow for comparison of provided passwords to ensure that they are correct.

As is evident to those of skill in the art, the password is not stored within the system. The key data is encoded with the password and can be decoded therewith. A password provided to the system is verifiable by hashing it and comparing the result to the stored hash result. That said, the stored hash result is not useful for uniquely determining the password.

Advantageously, what has been typed in by a user to encode any convenient data key, in the case of a password for example, is unknown because it is not stored on the hard drive. As such, someone trying to break into the system using data mining software for example will fail to find the password because none is stored in the system. What can eventually be found is an encoded key, or PIN, or access code that is useless to the hacker absent the password, and a hashed password.

The key data, which is an encoded key, is used for encoding accessible data. Encoding data transform them from an accessible data onto an inaccessible data. For example, if the accessible data are in a form of an intelligent human readable text, the key data transforms the readable text into a series of unintelligible symbols. Advantageously, the data are reversibly encoded by the data key so that a user can retrieve them upon the provision of the data key for decoding the encoded data. Otherwise, without providing the key data, only the encoded data, as for the example the series of unintelligible symbols are retrieved from the computer system. Further advantageously, the key data is provided to the system for reversibly transforming the data in one way or the other, but it is not stored in the computer system in unencoded form along with the encrypted data.

Of course, instead of providing a password to the computer system for initiating the encoding/decoding of key data for a security purpose, another value is usable. Such other value originates from a smart card belonging to a user that contains information, which triggers the encoding/decoding for example. Of course, other possessions such as digital keys, PCMCIA cards, chips and so forth are useful for providing longer more complex access codes.

In a subsequent step, the encoded key data is stored secured by biometric information of the user. For example, a fingerprint template is stored in association with the encoded data for retrieving the encoded data. Thus, both biometric information and a password or electronic code are necessary to access the key data. That said, data mining may provide access to encoded key data absent a step of biometric authentication.

Figure 2B:
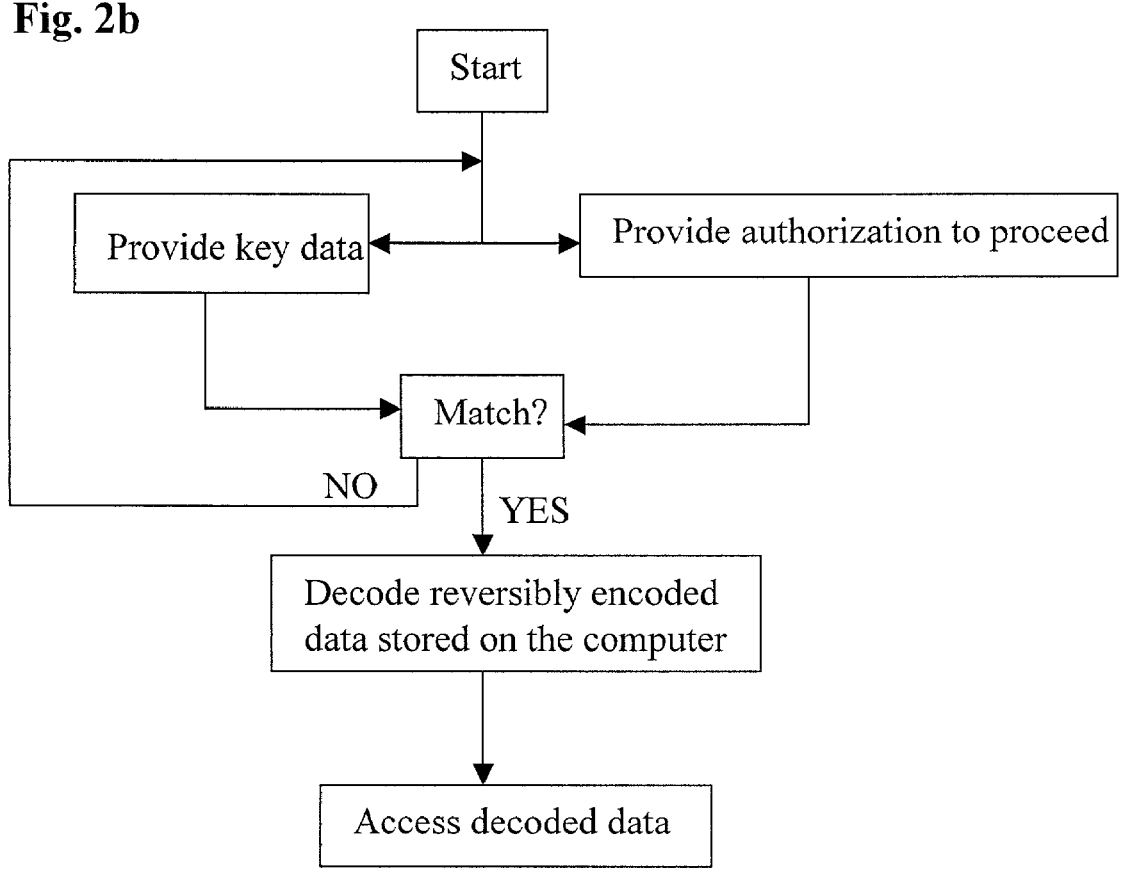
FIG. 2b shows a method of accessing the secured data stored on a computer system according to a preferred embodiment of the present invention.
Figure 3:
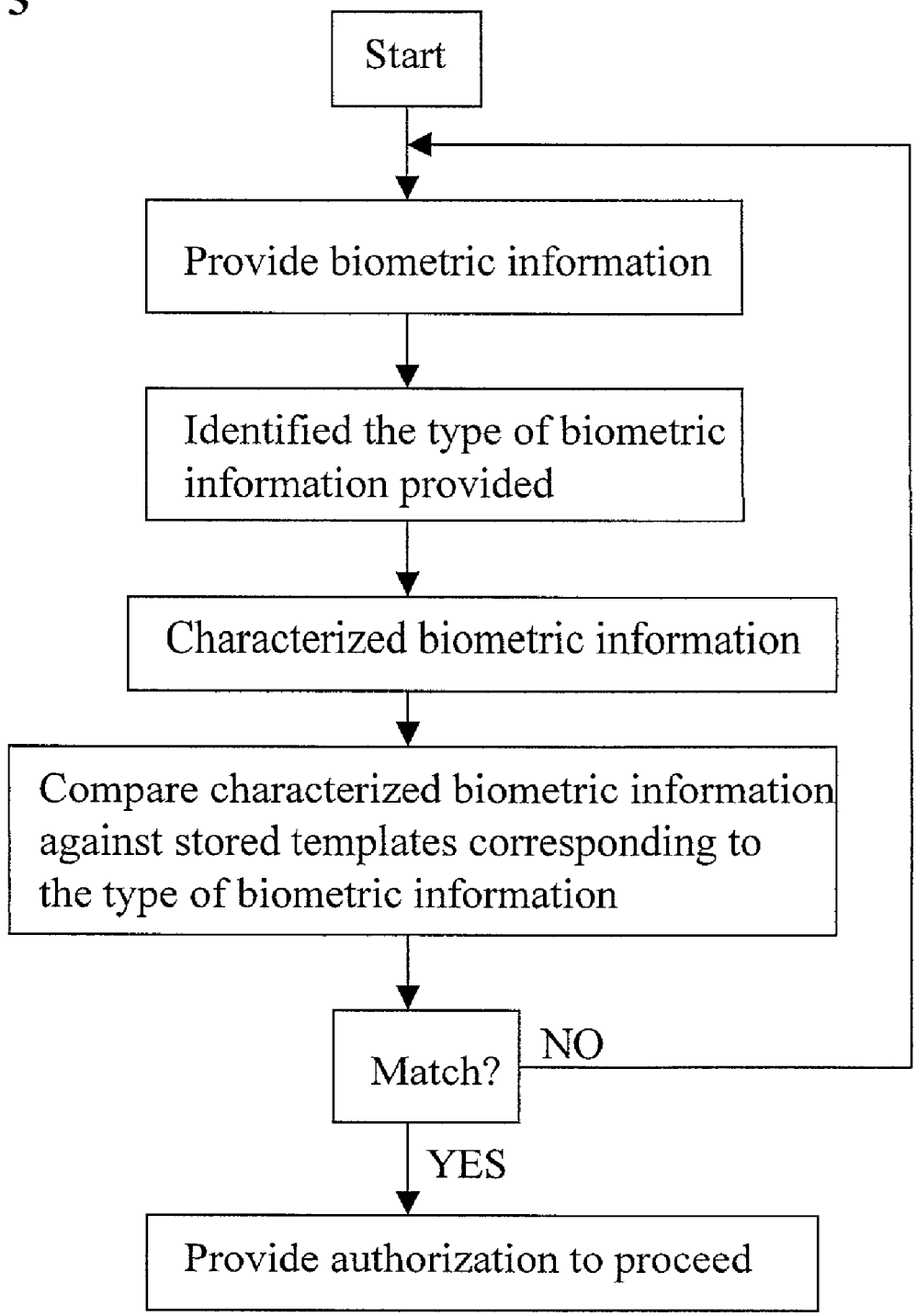
FIG. 3 is a flow diagram of a method of getting an authorization to proceed according to the invention.

Referring now to FIG. 2b, a method of accessing the secured data stored on a computer system is shown. In order to retrieve secured data stored within the computer system, the key data must be retrieved in decoded form. Retrieval of the encoded key data necessitates provision and registration of biometric information of the user in order to provide an authorization to proceed. As shown in FIG. 3, the authorization to proceed comprises identifying a user based on biometric information provided therefrom. This provides an indication that the correct person was actually present when the key data was retrieved. Typically, the user provides biometric information from a biometric source. The biometric information is characterized, processed and compared against templates stored in the system. Upon a match of the features extracted from the templates and the characterized biometric information corresponding to the biometric source provided by the user, an authorization to proceed is either provided or denied. Advantageously, the system discriminates between various types of biometric sources provided to the system. The biometric source is for example in the form of a fingertip, which is imaged on a contact imager. Furthermore, the biometric source reader is in the form of any imager as for example, but not limited to, a palm print imager, a retinal imager, toe print imager, or a hand writing recognition system. Alternatively, a voice sensor or a keystroke-timing sensor is used.

Referring back to FIG. 2b, the password data is needed for decoding the key data, and an authorization to proceed is also required for causing the decoding process to be performed. Thus, even once the user is authorized and authenticated by the biometric identification process, the key data is unavailable in decoded form until the password is provided. This allows for a more secure use of biometric authentication since the key data is other than stored in decoded form.

When a system supports a plurality of different login data formats, it is difficult to support the above method. For example, if a password or a smart card are usable to access a system, the key data cannot be decoded with the password or the smart card. Therefore, the key data are stored multiple times; each time encoded using a different one of the possible password data. This provides flexibility in identification and enhanced security over prior art methods. For example, when a system supports multiple methods of logging in such as (fingerprint and password), (fingerprint and smart card), (retina and smart card), (voice and password and digital key), and (password and smart card and typing interval data), the biometric data is substantially unchanging and its use in encoding of the key data is typically ineffective. Thus, the key data is encoded in each possible fashion to support each identification method. Here, as can be seen, encoding of the key data with the smart card code and separately with the password supports all access methods—the digital key being used with the password in one of the methods. Thus, each method remains supported and the key data is not stored in unencoded form.

Advantageously, as the system expands and access methods increase in numbers, such a method is sufficiently flexible to support changes and variations in system access requirements that arise over time.

Numerous other embodiments might be envisioned without departing from the scope and the spirit of the present invention.

What is claimed is:

1. A method of securing stored data on a computer system, the method comprising:

receiving one of several different password data at the computer system;

transforming key data with one of the several different password data in a reversible fashion to produce encoded key data such that the one of the several different password data is required in order to perform a reverse transform and extract the key data from the encoded key data; and storing the encoded key data such that the one of the several different password data and one of a plurality of user authorization processes, in combination, provide access to the key data, wherein the key data is encoded with each of the several different password data to provide different encoded key data for each user authorization process such that a combination of one of the user authorization processes and a respective password data of the several different password data allows for retrieval and decoding of the key data, and wherein the key data is for performing at least one of encrypting and decrypting the stored data on the computer system.

2. The method of claim 1, wherein each encoded key data is associated with one or more user authorization processes such that a combination of one or more user authorization processes and any of the several different password data allows for retrieval and decoding.

3. The method of claim 1, wherein the user authorization process is a biometric information verification process.

4. A method of securing stored data on a computer system, the method comprising:

comparing a biometric information source against stored templates associated with the biometric information source and, based upon a comparison result, pairing a biometric information source with a first individual identity;

receiving one of several different password data associated with the first individual identity, the one of the several different password data being other than that stored on the computer system; and retrieving encoded key data associated with the biometric information, and using the one of the several different password data for decoding the encoded key data, wherein the key data is encoded with the several different password data to provide different encoded key data for each user authorization process such that a combination of user authorization by the biometric information source in one of the user authorization processes and a different one of the several different password data allows for retrieval and decoding of the same security data, and wherein the key data is for performing at least one of encrypting and decrypting the stored data on the computer system.

5. The method of claim 4, wherein the decoded key data is for allowing access of the stored data to the identified individual.

6. The method of claim 4, further comprising receiving the biometric information source at the computer system before comparing the biometric information source, and wherein receiving the biometric information source comprises imaging the biometric information source using a contact imager.

7. The method of claim 6, wherein the contact imager is a fingerprint imager.

8. The method of claim 4, wherein receiving one of several different password data associated with the first individual identity comprises receiving a password.

9. The method of claim 4, wherein receiving one of several different password data associated with the first individual identity comprises receiving information stored on a smart card.

10. A method of securing data, the method comprising:
receiving a first information sample at a computer system;
encoding one of several different password data in dependence upon the first information sample to produce key data, the key data for use in decoding stored encoded data;
receiving at least one biometric information sample; and
securing the key data in dependence upon the at least one biometric information sample,
wherein the key data is encoded with the several different password data to provide different encoded key data for each user authorization process such that a combination of user authorization using the biometric information sample in one of the user authorization processes and a different one of the several different password data allows for retrieval and decoding of the key data, and
wherein the key data is for performing at least one of encrypting and decrypting the stored data on the computer system.

11. The method of claim 10, wherein receiving a first information sample at a computer system comprises hashing the first information sample to produce a first hash value.

12. The method of claim 10, further comprising:
receiving a second other information sample at the computer system;
hashing the second information sample to produce a second hash value;
encoding the one of the several different password data in dependence upon the second hash value to produce second key data; and
securing the second key data in dependence upon the at least one biometric information sample.

13. The method of claim 10, wherein receiving the first information sample at a computer system comprises receiving a password.

14. The method of claim 10, wherein receiving the first information sample at a computer system comprises receiving information stored on a smart card.

15. A method of securing data, comprising:
receiving a first information sample at a computer system;
receiving at least one biometric information sample;
encoding the at least one biometric information sample using the first information sample;
encoding one of several different password data based, at least in part, on the encoded biometric sample to produce key data; and
securing the key data based, at least in part, on the at least one biometric information sample,
wherein the key data is encoded with the several different password data to provide different encoded key data for each user authorization process such that a combination of user authorization using the biometric information sample in one of the user authorization processes and a different one of the several different password data allows for retrieval and decoding of the key data, and
wherein the key data is for performing at least one of encrypting and decrypting the stored data on the computer system.

16. The method of claim 15, wherein:
receiving a first information sample at a computer system comprises receiving a first information sample for decoding the encoded biometric sample; and
wherein the method further comprises comparing the decoded biometric sample against stored templates associated with the biometric information source.

17. The method of claim 15, wherein receiving a first information sample at a computer system comprises hashing the first information sample to produce a first hash value.

18. A computer system for securing stored data, the computer system comprising:
an input device configured to provide at least one of several different password data to the computer system;
a processing device configured to encode key data with the several different password data in a reversible fashion to produce different encoded key data for each user authorization process such that respective ones of the several different password data are required in order to perform a reverse transform and extract the key data from the encoded key data, wherein the processing device uses the key data for performing at least one of encrypting and decrypting the stored data on the computer system;
a memory device configured to store the encoded key data; and
a user authorization process configured to retrieve the encoded key data from the memory device such that at least one of the several different password data and the user authorization process, in combination, provide access to the key data, wherein a combination of user authorization using said user authorization process and a different one of the several different password data allows for retrieval and decoding of the key data.

19. The computer system of claim 18, further comprising a plurality of user authorization processes, wherein each encoded key data is associated with one or more user authorization processes such that a combination of one or more user authorization processes and any of the several different password data allows for retrieval and decoding of the key data.

20. A The computer system of claim 18, wherein the user authorization process is a biometric information verification process.

21. The computer system of claim 18, wherein the one of the several different password data includes a password.

22. A computer system for securing stored data, the computer system comprising:
means for comparing a biometric information source against stored templates associated with the biometric information source and, in dependence upon a comparison result, pairing a biometric information source with a first individual identity;
an input device configured to provide to the computer system a different password data for each user authorization process associated with the first individual identity, the password data being other than stored on the computer system;
means for retrieving encoded key data associated with the biometric information and for using the password data for decoding the encoded key data, wherein a combination of user authorization by the biometric information source in one of the user authorization processes and a different one of the different password data allows for retrieval and decoding of the same key data; and
means for performing at least one of encrypting and decrypting the stored data on the computer system using the decoded key data.

23. The computer system of claim 22, wherein the decoded key data allows access to the stored data by the identified individual.

24. The computer system of claim 22, wherein the comparing means comprises a contact imager configured to image the biometric information source.

25. The computer system of claim 24, wherein the contact imager is a fingerprint imager.

26. The computer system of claim 22, wherein at least one of the different password data comprises a password.

27. The computer system of claim 22, wherein at least one of the different password data is stored on a smart card.

28. A computer system for securing stored data, the computer system comprising:
- an input device configured to provide a first information sample to the computer system;
- means for encoding a key data with different password data for each user authentication process in dependence upon the first information sample to produce first security data, the key data for use in decoding the stored data;
- a biometric input device configured to provide at least one biometric information sample;
- means for securing the first security data in dependence upon at least one of the at least one biometric information sample in one of the user authorization processes, wherein a combination of user authorization using the biometric information sample and any of said different password keys allows for retrieval and decoding of the key data; and
- means for performing at least one of encrypting and decrypting the stored data on the computer system using the decoded key data.

29. The computer system of claim 28, further comprising means for hashing the first information sample to produce a first hash value.

30. The computer system of claim 28, wherein the first information sample comprises a password.

31. The computer system of claim 28, wherein the first information sample is stored on a smart card.

32. The computer system of claim 28, wherein the encoding means encrypts data using the key data.

33. A computer system for securing stored data, comprising:
- an input device configured to provide a first information sample to the computer system;
- a biometric input device configured to provide at least one biometric information sample to the computer system;
- means for encoding the at least one biometric information sample using the first information sample and for encoding one of several different password data in dependence upon the encoded biometric sample to produce key data, the key data for use in decoding stored encoded data, wherein the key data is encoded with the different password data for each user authorization process to provide different encoded key data such that a combination of user authorization using the biometric information sample in one of the user authorization processes and any of the different password data allows for retrieval and decoding of the key data;
- means for securing the key data in dependence upon at least one of the at least one biometric information sample; and
- means for performing at least one of encrypting and decrypting the stored data on the computer system using the decoded key data.

34. The computer system of claim 33, further comprising:
- means for decoding the encoded biometric sample using a first information sample provided by the input device; and
- means for comparing the decoded biometric sample against stored templates associated with the biometric information source.

35. A computer readable storage medium for securing stored data on a computer system, the computer readable storage medium having computer executable instructions stored thereon that, when executed, perform a method comprising:
- transforming key data with one of several different password data from the computer system in a reversible fashion to produce encoded key data such that the one of the several different password data is required in order to perform a reverse transform and extract the key data from the encoded key data; and
- storing the encoded key data such that the one of the several different password data and one of a plurality of user authorization processes, in combination, provide access to the key data,
- wherein the key data is encoded with each of the several different password data to provide different encoded key data for each user authorization process such that a combination of one of the user authorization processes and a respective password data of the several different password data allows for retrieval and decoding of the key data, and
- wherein the key data is for performing at least one of encrypting and decrypting the stored data on the computer system.

36. The computer readable medium of claim 35, wherein each encoded key data is associated with one or more user authorization processes such that a combination of one or more user authorization processes and any of the several different password data allows for retrieval and decoding.

37. The computer readable medium of claim 35, wherein the user authorization process is a biometric information verification process.

* * * * *